F. W. COHEN & M. G. HILPERT.
MECHANISM FOR LIFTING HEAVY WEIGHTS.
APPLICATION FILED NOV. 3, 1910.
1,063,156.
Patented May 27, 1913.
6 SHEETS—SHEET 1.
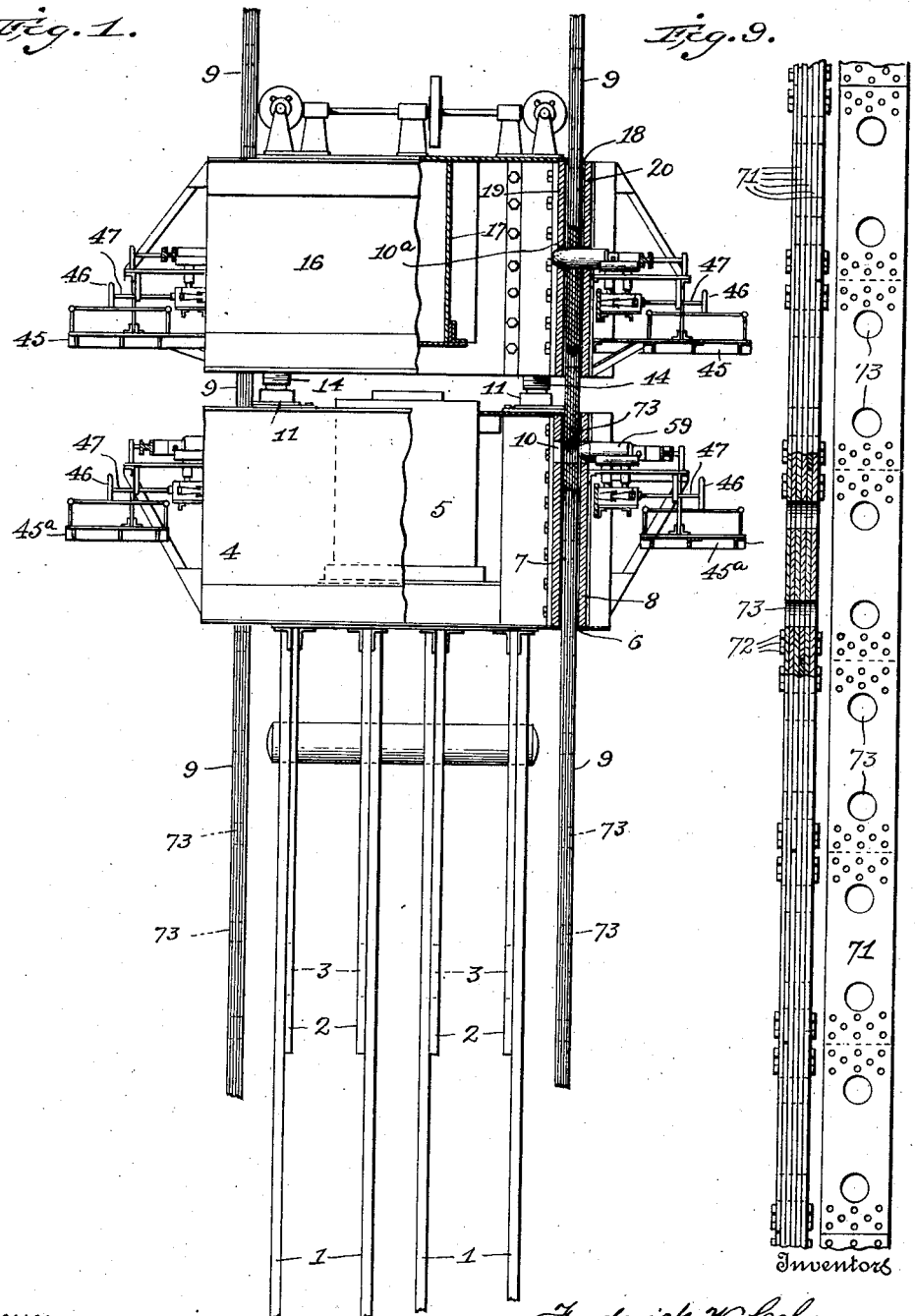

F. W. COHEN & M. G. HILPERT.
MECHANISM FOR LIFTING HEAVY WEIGHTS.
APPLICATION FILED NOV. 3, 1910.
1,063,156.
Patented May 27, 1913.
6 SHEETS—SHEET 2.
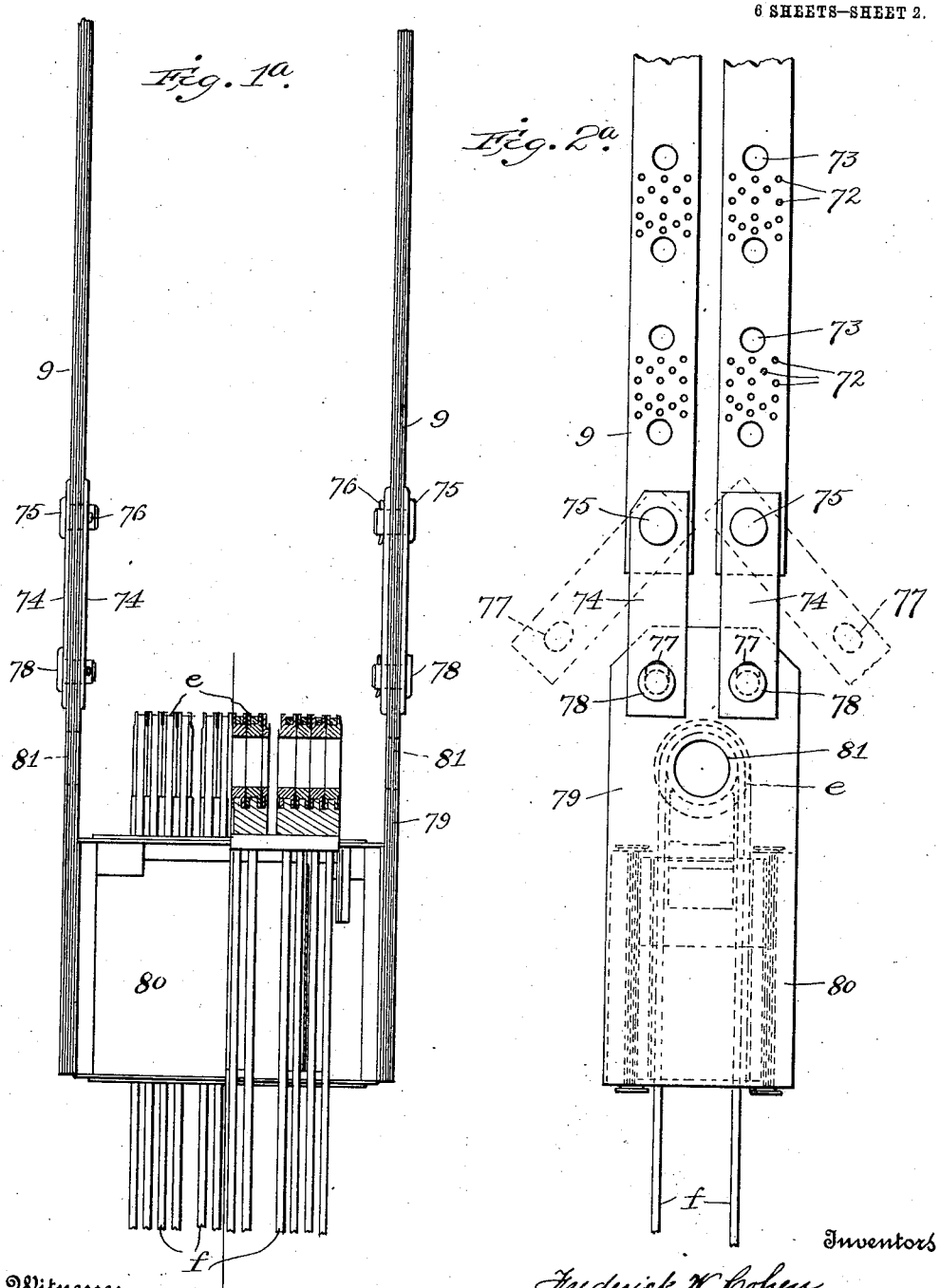

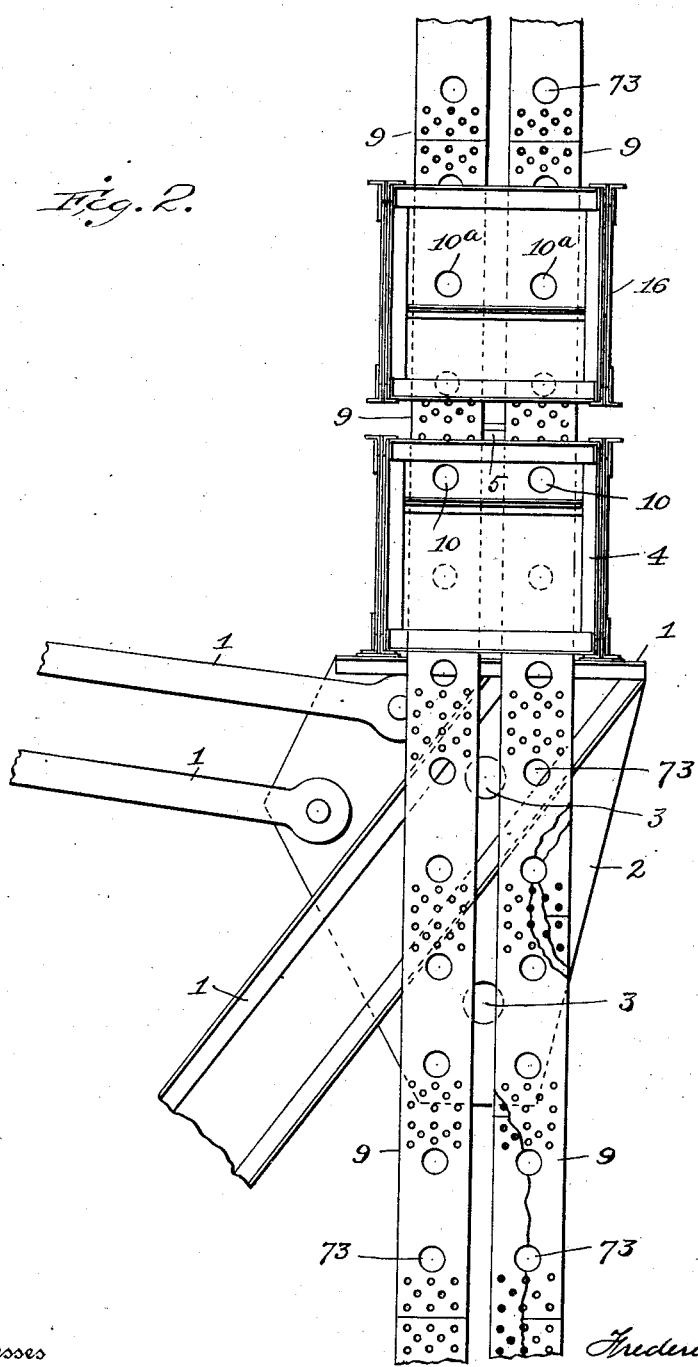

F. W. COHEN & M. G. HILPERT.
MECHANISM FOR LIFTING HEAVY WEIGHTS.
APPLICATION FILED NOV. 3, 1910.
1,063,156.
Patented May 27, 1913.
6 SHEETS—SHEET 4.
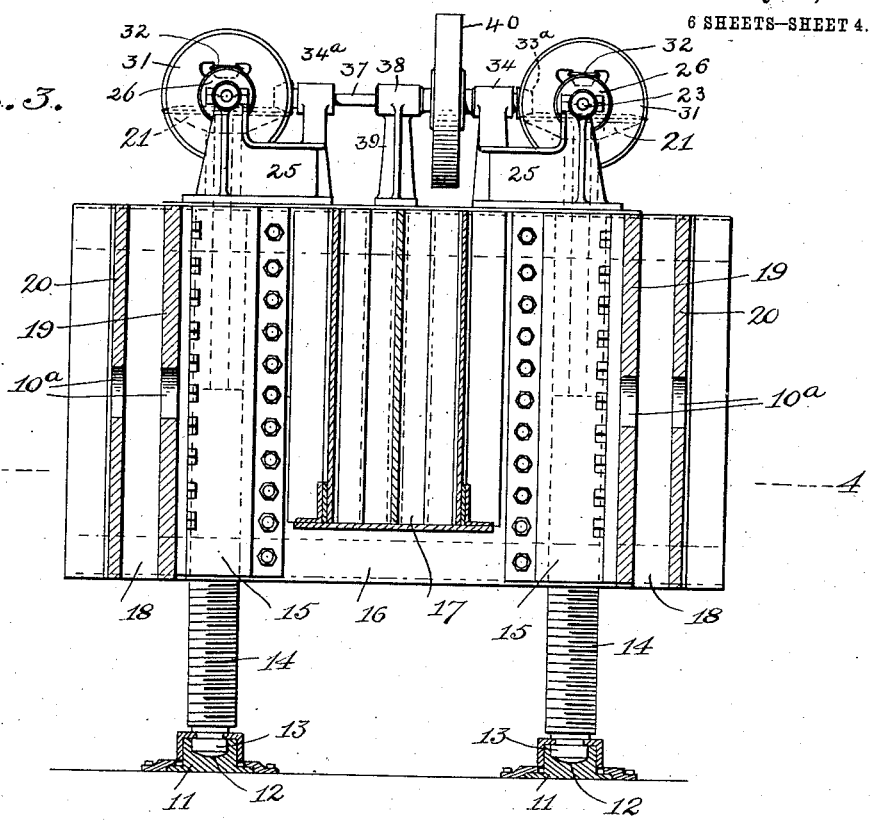
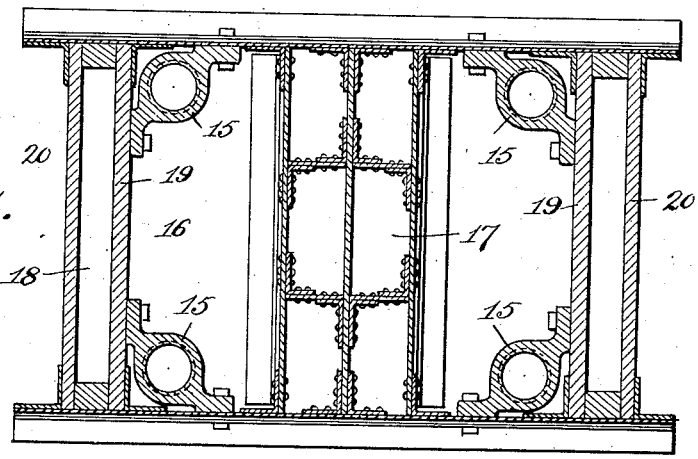
Witnesses
B. Sommers
May Ellis
Inventors
Frederick W. Cohen
Meier G. Hilpert
By Henry Orth
Attorney

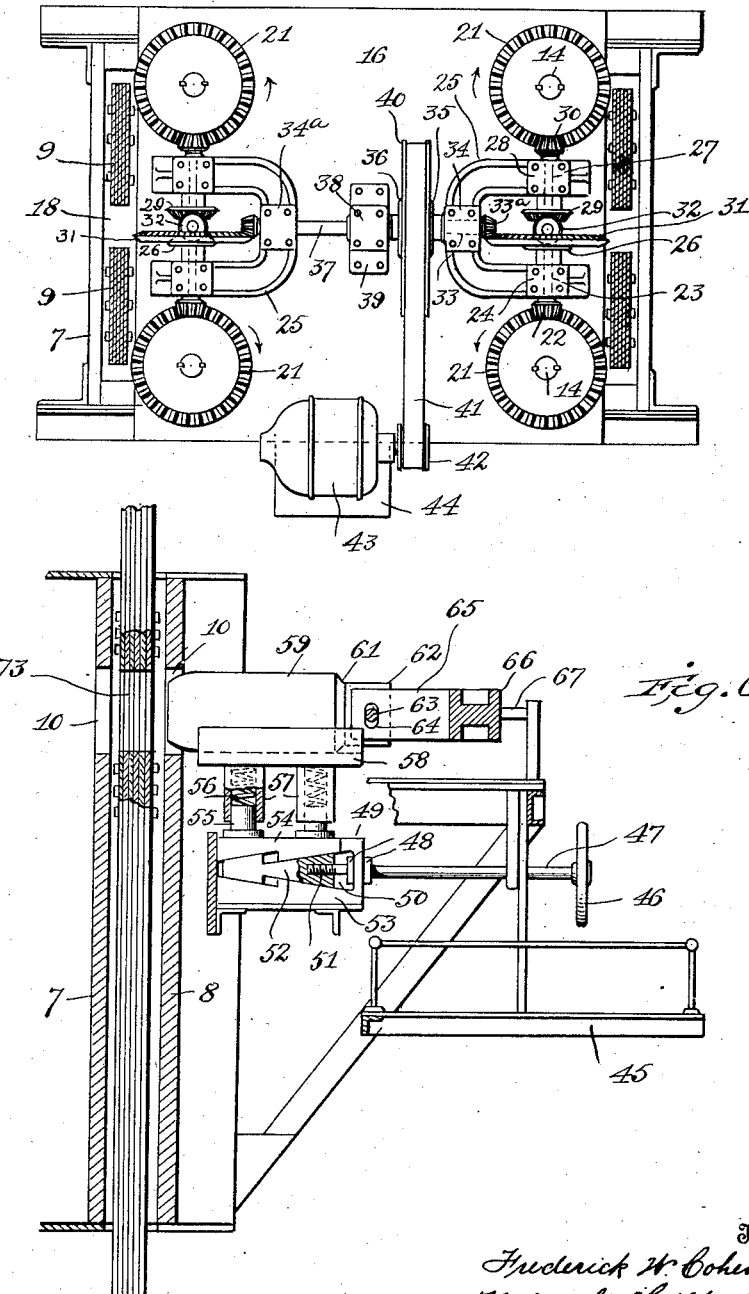

F. W. COHEN & M. G. HILPERT.
MECHANISM FOR LIFTING HEAVY WEIGHTS.
APPLICATION FILED NOV. 3, 1910.
1,063,156.
Patented May 27, 1913.
6 SHEETS—SHEET 6.
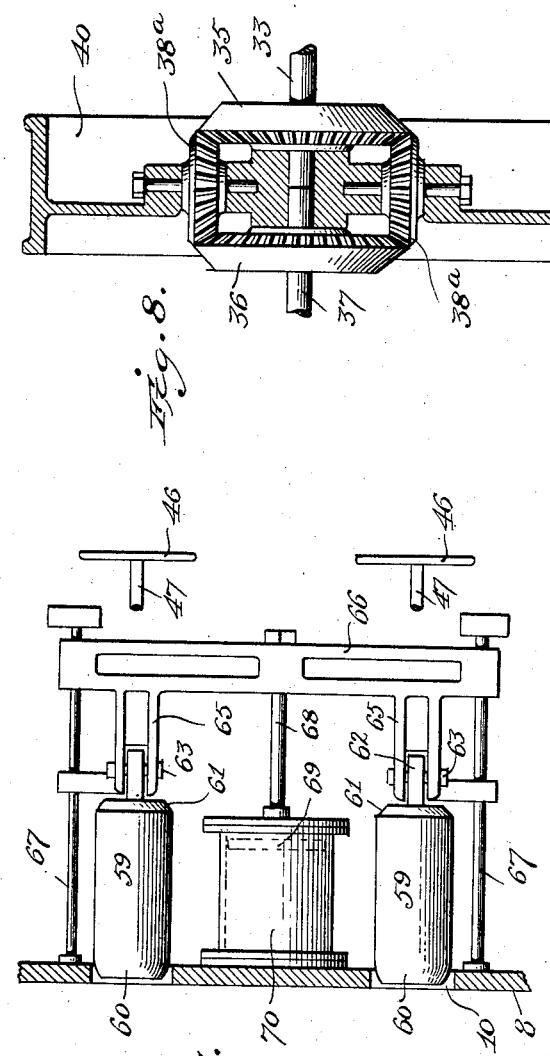
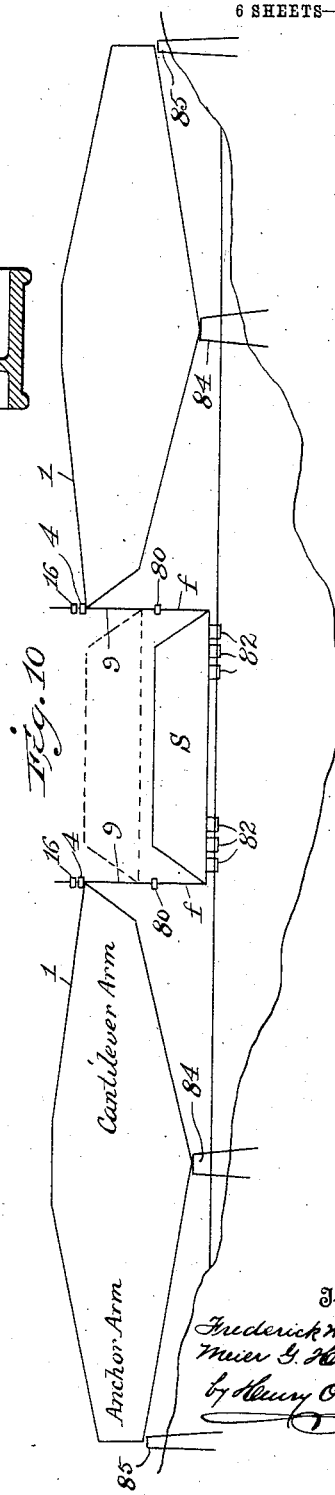

UNITED STATES PATENT OFFICE.

FREDERICK W. COHEN AND MEIER GEO. HILPERT, OF HARRISBURG, PENNSYLVANIA, ASSIGNORS TO THE PENNSYLVANIA STEEL COMPANY, OF PHILADELPHIA, PENNSYLVANIA, A CORPORATION OF PENNSYLVANIA.

MECHANISM FOR LIFTING HEAVY WEIGHTS.

1,063,156.      Specification of Letters Patent.      Patented May 27, 1913.

Application filed November 3, 1910. Serial No. 590,570.

*To all whom it may concern:*

Be it known that we, FREDERICK W. COHEN and MEIER GEORGE HILPERT, citizens of the United States of America, residing at Harrisburg, county of Dauphin, State of Pennsylvania, United States of America, have invented certain new and useful Improvements in Mechanism for Lifting Heavy Weights; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to lifting devices intended for the lifting of heavy weights, especially large, unwieldy weights such as are found in structural iron and steel erection work, and is more particularly applicable to the lifting of bridge spans, trusses, and other assembled structural work.

We have chosen to illustrate the invention as applied to the lifting of assembled bridge work, specifically heavy bridge spans too heavy to be lifted by ropes.

Referring to the drawings, in which like parts are similarly designated—Figures 1 and 1ᵃ together show a front elevation of the mechanism embodying our invention as mounted on the end of a cantaliver arm of a cantaliver bridge, and connected at its lower end to a tension member of the suspended or center span that is to be lifted into place, Figs. 2 and 2ᵃ together show a side elevation of Figs. 1 and 1ᵃ, the pin-actuating mechanism being omitted. Fig. 3 is a vertical section through the lifting member with some of the parts in elevation. Fig. 4 is a horizontal section on line 4—4 of Fig. 3. Fig. 5 is a plan view of the lifting member. Fig. 6 is an enlarged side elevation of one of the suspender-pin-actuating mechanisms. Fig. 7 is a plan view of Fig. 6. Fig. 8 is an enlarged central sectional view of one of the differential mechanisms on the lifting member. Fig. 9 is an enlarged front elevation and side elevation partly in section of one of the sectional suspenders, showing the means of connecting the plates. Fig. 10 is a diagram illustrating the manner of using our invention.

The device is designed for the lifting of such ponderous and unwieldy elements of maximum or unusual weight which it is impracticable to lift with the usual powerful rope tackle of any type, owing to the impossibility of overcoming the friction within the rope, the bending stresses, &c. By this device we are enabled to handle readily, with a minimum expenditure of power, weights of 10,000 tons and upward.

The drawings show the center span, or the channel or suspended span, as it is called, of a cantaliver bridge that is to be lifted into place to connect the opposite cantaliver arms 1.

In Figs. 1 and 2 the end of a cantaliver arm is shown at 1, having depending connecting plates 2 provided with holes 3, in which the pins, that are to hold the suspended member or bridge span in its final position, are to be inserted. These pins are very large, weighing about six tons each, and are swung from independent apparatus (not shown) mounted on the cantaliver arms. Mounted on the end of each cantaliver arm 1, (there are usually four such arms on a cantaliver bridge,) is a box-like sustaining member 4 projecting beyond the sides of the cantaliver arm which is made up of structural shapes riveted or otherwise secured together and constructed as a diaphragmed girder. In each box is placed and properly supported a powerful hydraulic jack 5. The overhanging sides of the box are provided with vertical guideways 6 formed between a vertical inner wall 7 and a vertical outer wall 8. There is a guideway 6 at each side of the sustaining member, clear of the sides of the cantaliver arm on which the sustaining member is mounted. Through these passages or guideways 6 pass suspenders 9, hereinafter more particularly described. The walls 7 and 8 are provided with registering perforations or holes 10.

Mounted on top of and secured to the sustaining member 4 are bases or castings 11, Figs. 1 and 3, having spherical seats 12. There is one of these bases at or near each of the four corners of the sustaining member 4. Each base 11 supports and is engaged by the lower spherical end 13 of a vertical screw 14 that engages with a casting 15 having a female thread coöperating with the thread on the screw, and acting as a nut. These castings are bolted or otherwise suitably secured in a box-like lifting member 16. At the center of the lifting member, and extending between the front and rear walls thereof, is a central pillar 17, Figs. 1, 3 and 4, composed of structural shapes. This pillar 17 is intended to rest directly on the jack 5, say a 2,500 ton jack, when the lifting member is being raised and lowered.

The box-like lifting member 16 has at each side thereof clear of the cantaliver arm vertical guideways 18, above and in vertical alinement with the guideways 6 in the sustaining member 4. These guideways 18 are formed between the inner side walls 19 and the outer side walls 20, similar to and identical in function with the side walls 7 and 8 in the sustaining member, and are similarly constructed. The walls 19 and 20 are provided with holes 10$^a$ similar to the holes 10 in the sustaining member and for a like purpose.

On the upper end of each screw is secured a bevel gear wheel 21, more clearly shown in Figs. 3 and 5. One of these wheels 21 on the right hand side of the lifting member 16, is engaged by a bevel pinion 22 secured to one end of a shaft 23 that is mounted in a bearing 24 on a yoke-shaped pedestal 25 mounted on top of the lifting member 16. On the other end of the shaft 23 is secured a bevel wheel 26. The end of shaft 23 projects beyond the bevel wheel 26 and abuts against the projecting end of a like shaft 27 in alinement therewith and mounted in a bearing 28 on the pedestal 25. This shaft 27 carries a bevel wheel 29 identical with bevel wheel 26, and a pinion 30 that drives a second bevel wheel 21 on the other screw 14 on the right hand side of the lifting member 16. The bevel gear wheels 26 and 29 are located between the two arms of the yoke-shaped pedestal 25.

Mounted loose on the ends of the alined shafts 23 and 27 that project between the bevel gear wheels 26 and 29 is a bevel gear wheel 31 that carries a pair of planet bevel pinions 32 that mesh with both of the bevel gear wheels 26 and 29.

The mechanism just described forms an equalizing or compensating mechanism for driving the two screws 14 at the right hand side of the lifting member 16, Figs. 3, 4, and 5, and is similar to the mechanism shown in Fig. 8, in which figure a belt pulley is shown as carrying planet bevel pinions similar to those carried by bevel gear wheel 31. This mechanism is duplicated for the two screws 14 at the left hand side of the lifting member 16. The bevel gear wheel 31 is driven by a bevel pinion 33$^a$ secured on the end of a short shaft 33 mounted in a bearing 34 at the middle of the yoke-shaped pedestal 25. The shaft 33 has secured on its opposite end a bevel gear wheel 35. Opposite the bevel gear wheel 35 is a similar bevel gear wheel 36 on a shaft 37 in alinement with the shaft 33. Both shafts 33 and 37 project beyond wheels 35 and 36 into the gap formed between them, clearly shown in Fig. 8. This shaft 37 drives the duplicate of the equalizing or compensating mechanism on the other (left) side of the lifting member 16, and has bearing at one end in a bearing 34$^a$ on the left hand yoke-shaped pedestal 25 and at the other end in a bearing 38 in a pedestal 39. Meshing with both of the bevel gear wheels 35 and 36 is a pair of loose pinion or planet wheels 38$^a$ mounted in and carried by a belt pulley 40 driven by a belt 41 from a small pulley 42 secured on the rotor of a standard make of electric motor 43. The motor 43 is supported on a shelf 44 projecting from the top of the lifting member 16.

The lifting member 16 and the pertaining sustaining member 4 are each provided at each side with an operator's platform 45 and 45$^a$ respectively, secured to structural iron work and projecting from the sides of the members. From these platforms 45 and 45$^a$ operators can manipulate the pin-handling mechanisms, there being four such mechanisms, two supported at the sides of the lifting member 16, and two supported at the sides of the sustaining member 4, as shown in Fig. 1. As these mechanisms are duplicates of one another, we will describe but one of them, as illustrated on a larger scale in elevation and plan in Figs. 6 and 7.

From a platform 45, or 45$^a$ an operator can manipulate a hand wheel 46 secured to a spindle 47 held against longitudinal movement by collars 48 at the front and rear faces of the front wall 49 of a wedge box 50. The end of spindle 47 is threaded to form a screw 51 that enters the end of a longitudinally and horizontally movable wedge 52 that has two upper and two lower inclined faces. The lower inclined faces coöperate with two inclined faces of a stationary wedging member 53 forming the bottom of the wedge box 50. Within the wedge box 50 is a vertically movable wedging member 54 having two inclines which rest on the upper inclined faces of the movable wedge 52. This vertically movable wedging member 54 is guided vertically by the walls of the box 50 as it is wedged upward by the wedge 52 or permitted to drop, as the case may be.

The number of wedging faces on the top and bottom of the wedge and on the wedging members may be increased, if so desired, and thus prevent the inclines from reducing the cross-section of the metal at the ends of the inclines to too great a degree, by reason of the taper.

The vertically movable wedge member 54 supports two spring seats 55, one over each of its two inclined faces, on which seats are seated heavy coil springs 56 contained in and supporting tubular cases 57 having a small amount of vertical play, by reason of being held so that their lower ends are prevented from striking the seats. The two tubular spring cases 57 support a saddle 58 in which rests a pin 59 coöperating with the holes 10 or 10$^a$ of the member to connect a suspender thereto. The pin 59 is provided with a tapered or rounded pilot forward end 60 and a chamfered rear end 61. The rear end 61 is provided with a web 62 designed to project between flanges 65 on a cross-head 66, the web being yieldingly connected to the flanges by a pin 63 which projects through the web and through vertical slots 64 formed in the flanges 65.

The cross-head 66 is mounted to slide on guide rods 67, suitably supported from the structural iron work at the side of the member.

We have shown two pins 59 at right and left side of each of the two members 4 and 16 supported and adjusted by two wedges, said two pins being connected to and longitudinally moved by a single cross-head 66. The cross-head is connected to one end of a rod 68, on the other end of which is a piston 69 in an air, steam, or other power cylinder 70. The operation of the piston moves the cross-head 66 to simultaneously insert or withdraw both pins 59.

The suspenders 9, operating in conjunction with a lifting member 16 and its pertaining sustaining member 4, we have shown as four in number, but their number may be increased or decreased at will. Each suspender 9 is built up of several layers of flat steel plates 71, each layer consisting of plates of such length as will avoid having the abutting joints of any layer come opposite similar joints in any other layer, thereby arranging the ends of the plates in echelon. Every plate of every layer will have a series of registering holes for the insertion of bolts 72 which pass through all layers, at regular intervals, by which bolts the several layers of plates are bound together throughout the whole length of the suspender, thus insuring that the suspender may have a practically uniform strength throughout its whole length as of an integral suspender. The suspenders 9 are also provided with a series of holes 73, spaced in this instance at regular intervals, of three feet center to center.

At the bottom of each suspender 9, Figs. 1$^a$ and 2$^a$, is a pair of links 74 pivoted by a headed pin 75 held in place by a cotter 76. Each link has a slot 77 in its lower end through which passes a headed pin 78 similar to pins 75 that connect the lower end of the link to an ear 79. One of these ears is at each side of a chair 80, and each car has two perforations in which the pins 78 are held. Each ear also has a hole 81 larger than the bridge pin intended to be inserted in the upper end or eye $e$ of the tension member $f$ for suspending and holding the center span of a cantaliver bridge in place.

We will describe the operation of our invention in connection with the lifting into place of the suspended spans of a cantaliver bridge, Fig. 10. This span is erected, and preferably finished, on suitable floats 82 near the bridge. The cantaliver trusses comprising a cantaliver arm and an anchor arm, are erected on their piers 84 and 85, there being at least two cantaliver trusses on each side of the river. We then place or erect on the extreme end of each cantaliver arm 1 a sustaining member 4, which, as shown in the drawings, is of the general type of a diaphragmed girder, and the powerful hydraulic jack 5 is placed centrally therein, as shown. Above the sustaining member is placed or erected the lifting member 16. The suspenders 9, composed as described, are hung from pins 59 inserted in the holes 10$^a$ of the lifting member 16. The lower ends of the suspenders are connected in any suitable manner to the span to be lifted. We have chosen to show it connected to a chair 80. After the suspenders are in place the links 74 are spread to dotted line position Fig. 2$^a$. The eyes $e$ of the connecting tension members $f$ at each corner of the suspended bridge span rest in chairs 80, which are supported by suitable false work on the floats 82. The bridge span is now floated into position, directly under the gap between the cantaliver arms 1 on opposite sides of the river. The links 74 are moved into full line position, Fig. 2$^a$, and pins 77 inserted in the ears 79 of the chairs 80. We have shown four suspenders 9 connected to each chair, each set of four coöperating with a suspending member and a lifting member. Power is applied to the jacks 5, which operate simultaneously, and they raise the lifting members, the suspenders, and the span bodily. While the jacks are in operation the motors 43 on the several lifting members are operated to maintain the screws 14 against their seats 12. If for any reason a slight tipping of the lifting member takes place, causing one or more of the suspending members of a set to rise in advance of the others while being raised by the jack, one or more of the screws 14 takes load in advance of the others, and stops, the equalizing mechanism permitting the other screws to continue until all are properly loaded.

The equalizing mechanism carried by the lifting member, together with the screws 14, is not intended to raise the lifting member 16, but is rather intended as a safety mechanism to sustain the lifting member in any position between limits, should a jack fail to act.

When the four lifting members have reached their limit (three feet in the particular construction described) a set of holes 73 of the suspenders 9 is now in register with the holes 10 of the sustaining member 4. The workmen on the platform 45ᵃ of the sustaining member 4 then operate the pneumatic piston 70 that moves yoke 66 to insert the pins 59. After the insertion of all the pins, (in this particular case four in each sustaining member,) the jacks are somewhat lowered, the safety mechanism following them, so as to take the load off the pins in the lifting member. The similar pin-handling mechanisms on each side of each lifting member are operated to withdraw the pins. The lifting members are then lowered until in position for re-insertion of the pins in the next lower holes 73 (three feet below) in the suspenders 9, which is then done, the pins of the sustaining member are then withdrawn and the lifting member again raised, as described. During the raising of the lifting member those plates of the suspender projecting above the lifting member are disconnected and removed as fast as they completely emerge from the lifting member. Thus the bridge span is raised step by step until the eye $e$ registers with the holes 3 in the plates 2 at the ends of the cantaliver arms. The bridge pin is then passed through hole 81 in the ears of the chair 80 and forced into the eye $e$. The chair, sustaining and lifting members are then removed and the span is in its final position, held by the bridge pin.

It is to be understood that the parts composed of structural shapes are riveted together, and we have omitted showing much of the riveting, believing that the drawings are rendered clearer by the omission.

We claim:—

1. In a mechanism for lifting heavy weights, the combination with a main sustaining member, of a lifting member, a hydraulic jack centrally supporting the latter, auxiliary sustaining members carried by the lifting member, and means on the lifting member to maintain the auxiliary sustaining members in contact with the main sustaining member.

2. In a mechanism for lifting heavy weights, the combination with a sustaining member having vertical passages between a pair of walls at its sides, said walls having alined holes therein; of a lifting member having vertical passages in alinement with those in the sustaining member and formed between similar walls also having alined holes, suspenders free to pass through said passages and having holes adapted to be brought into register with those in said walls, pins to be inserted in the holes when in register, whereby said walls will sustain the load on the suspenders, pin inserting and withdrawing mechanism carried by said members, and means to raise the lifting member.

3. In a mechanism for lifting heavy weights, the combination with a sustaining member constructed as a webbed girder having a vertical passage between a pair of walls at each side of the member, said walls having alined holes therein; of a lifting member also constructed as a webbed girder having a pair of walls at each side between which passages are formed in alinement with those in the sustaining member, a hydraulic jack mounted centrally of and between the members, suspenders having holes at intervals adapted to register with the alined holes in both members, pins adapted to enter the holes in said walls and suspenders, whereby said lifting and suspending member walls directly support the load of the suspenders on the pins.

4. In a mechanism for lifting heavy weights, the combination with a lifting member and a sustaining member both having holes in their sides, means to raise the lifting member, suspenders having holes at intervals, and pins adapted to take through said holes to connect the suspenders to the members, of a pin inserting and withdrawing mechanism carried by said members.

5. In a mechanism for lifting heavy weights, the combination with a lifting member and a sustaining member both having holes in their sides, means to raise the lifting member, suspenders having holes at intervals and pins adapted to take through said holes to connect the suspenders to the members, of pin supports carried by said members, and power mechanism to which the pins are yieldingly connected to longitudinally move the pins.

6. In a mechanism for lifting heavy weights, the combination with a lifting and a sustaining member, both having holes in their sides, means to raise the lifting member, and suspenders having holes at intervals and coöperating with the members; of a pin inserting and withdrawing mechanism carried by a member comprising means for adjusting the pins to the holes, and power mechanism to which the pins are yieldingly connected to longitudinally move the pins.

7. The combination with a member of a lifting mechanism and a pair of pins thereof; of a pin actuating mechanism comprising a pair of saddles to support the pins, means to yieldingly support the saddles, and means to adjust the latter.

8. The combination with a member of a lifting mechanism and a pair of pins thereof; of pin actuating mechanism comprising a pair of saddles on which the pins rest, means to yieldingly support the saddles, means to adjust them, and power mechanism to which said pins are pivotally connected to move the pins longitudinally.

9. The combination with a member of a lifting mechanism having a hole in its side; of a pin, a saddle in which the pin rests, means to yieldingly support the saddle, hand-operated wedging mechanism to adjust the saddle and pin, and pneumatic mechanism to longitudinally move the pin and to which the pin is connected.

10. The combination with a member of a lifting mechanism having a plurality of holes in its side; of pins to enter the holes, means to support the pins at approximately the level of the holes, means to independently adjust the pins relatively to the holes and power means common to the pins to simultaneously move them longitudinally, whereby the pins are inserted in and withdrawn from the holes.

11. The combination with a member of a lifting mechanism having a hole in its side; of a pilot ended pin having a web on its rear end, a saddle to support the pin approximately at the level of the hole, a pair of coil springs supporting the saddle, an adjusting mechanism comprising a stationary wedge member supported on the mechanism, a vertically movable wedge member on which the springs are mounted, a wedge between the two wedge members and a hand-operated screw to longitudinally move the wedge, and power mechanism to longitudinally move the pins.

12. The combination with a member of a lifting mechanism having a hole in its side; of a plurality of pilot ended pins having webs on their rear ends, a saddle to support each pin at approximately the level of the holes in the members with which they coöperate, a pair of coil springs to support each saddle, a vertically movable wedge member supporting the springs of each saddle and having parallel wedging faces, one under each spring, a stationary wedging member for each saddle also having two parallel wedging faces and supported from said member of the lifting mechanism, a horizontally movable wedge between the horizontally movable pair of wedging members, a screw to reciprocate each wedge, a hand wheel on each screw, a cross-head supported from said member of the lifting mechanism and having pairs of slotted flanges to embrace the webs on the pins, smaller pins passing through the webs and slots, an air cylinder, and a piston therein connected to the cross-head.

13. The lifting member of a lifting mechanism, comprising a substantially rectangular webbed girder having a central vertical transverse pillar, a pair of lateral walls at each side having holes therein and between which walls are formed vertical suspender passages.

14. In a mechanism for lifting heavy weights, the combination with a sustaining member; of a lifting member, means between the members to raise the lifting member, and mechanism carried by the lifting member and engaging the sustaining member to follow up the lifting means and support the lifting member in its relative position to the sustaining member should the raising means fail at any time during the raising of the lifting member, load suspenders and means for connecting said suspenders to either of said members.

15. In a mechanism for lifting heavy weights, the combination with a sustaining member; of a lifting member, a jack between the members, a plurality of screws on the lifting member, mechanism to both simultaneously and independently actuate the screws, and load suspenders adapted to be alternately connected to the members.

16. In a mechanism for lifting heavy weights, the combination with a sustaining member; of a lifting member, a jack between the members, a plurality of screws in the lifting member whose ends have bearing on the sustaining member, differential actuating devices between the screws taken two and two, and differential driving means between pairs of differential actuating devices.

17. In a mechanism for lifting heavy weights, the combination with a sustaining member; of a lifting member, a jack between the members, each of said members having a pair of walls between which are formed vertical passages at each side of the member, two suspenders movable in the passages at each side of the members, each of said suspenders composed of sections each section consisting of plates bolted together in echelon and holes through the connected sections, a pin to pass through each of the side walls of each member, each entering a hole in a suspender, and mechanism for inserting and withdrawing the pins.

In testimony that we claim the foregoing as our invention, we have signed our names in presence of two subscribing witnesses.

FREDERICK W. COHEN.
MEIER GEO. HILPERT.

Witnesses:
  Geo. W. Parsons,
  Albert F. Leeds.

---

Copies of this patent may be obtained for five cents each, by addressing the "Commissioner of Patents, Washington, D. C."